UNITED STATES PATENT OFFICE.

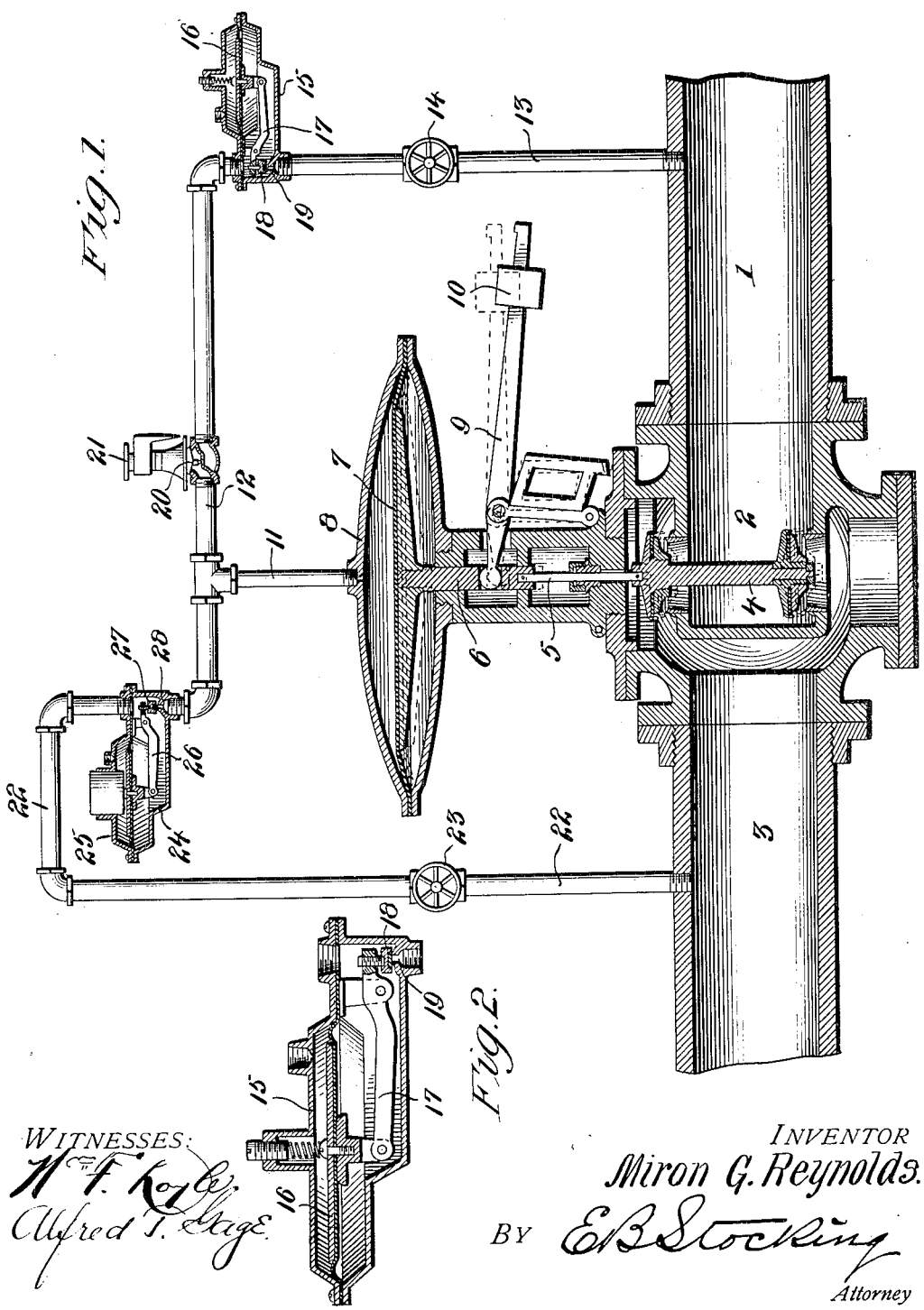

MIRON G. REYNOLDS, OF ANDERSON, INDIANA.

PRESSURE-CONTROLLING SYSTEM.

No. 843,174.  Specification of Letters Patent.  Patented Feb. 5, 1907.

Application filed September 24, 1906. Serial No. 336,049.

*To all whom it may concern:*

Be it known that I, MIRON G. REYNOLDS, a citizen of the United States, residing at Anderson, in the county of Madison, State of Indiana, have invented certain new and useful Improvements in Pressure-Controlling Systems, of which the following is a specification, reference being had therein to the accompanying drawings.

This invention relates to a pressure-controlling system, and particularly to an auxiliary system for controlling the pressure exerted upon the diaphragm of a valve-operating regulator.

The invention has for an object to control the pressure exerted upon the valve-operating regulator so as to maintain a steady pressure in the service-mains at all times regardless of the consumption and to avoid a pressure-leak through the regulating system from the high-pressure to the low-pressure main, which prevents a tight closing of the valve under many conditions.

Other and further objects and advantages of the invention will be hereinafter set forth and the novel features thereof defined by the appended claims.

In the drawings, Figure 1 is a vertical section showing the application of the invention, and Fig. 2 is an enlarged detail section through one of the auxiliary regulators.

Like numerals refer to like parts in the several views of the drawings.

The numeral 1 designates the high-pressure main, which is provided with the valve-casing 2 of any ordinary construction, having connected therewith a low-pressure or service main 3. Disposed within this valve-casing is a reciprocating valve 4 of ordinary construction, the stem 5 of which is connected with the depending stem 6 from the diaphragm 7 of the main or valve-operating regulator 8, by which the valve is shifted or moved corresponding to the pressure exerted upon this diaphragm. The diaphragm is also under the opposing pressure of the pivoted lever 9, provided with the weight 10. This main regulator is connected with an auxiliary system by means of the pipe 11, extending downward from the pipe 12, which is in communication at one end with the high-pressure main by means of the pipe 13, provided with the ordinary controlling-valve 14 and with the auxiliary high-pressure regulator 15. This regulator may be of any suitable construction, and that herein shown is substantially similar to that disclosed in my prior patent, No. 746,879, of December 15, 1902, wherein the diaphragm 16 is connected with the pivoted lever 17, carrying the valve 18, which coöperates with the apertured seat 19 at the discharge from the pipe 13. This regulator is connected so that the high pressure operates beneath the diaphragm, and intermediate of the regulator and the connection 11 to the main regulator a needle-valve 20 is applied, the same being of any desired construction and adapted to be operated by the handle 21 in the usual manner. The pipe 12 is also connected at its opposite end with the low-pressure main 3 by means of the pipe 22, provided with the controlling-valve 23 and communicating with the weighted regulator 24, in which the diaphragm 25 is connected with the lever 26, carrying the valve-block 27, adapted to coöperate with the apertured seat 28 therein.

From the foregoing it will be seen that an increase of pressure upon the upper surface of the diaphragm of the main regulator will cause a movement of the valve downward into the dotted-line position for closing the same, while this valve is opened upon a reduction of pressure because of the weighted lever connected to the stem of the regulator.

In the operation of this system with the high pressure at any desired amount—for instance, twenty-five pounds—and the low pressure at one ounce the auxiliary high-pressure regulator is set to carry eight ounces of pressure without closing, while the needle-valve is partially opened, so as to allow a small volume of gas under this pressure to pass to the upper surface of the valve-operating regulator. The low-pressure auxiliary regulator is also set to deliver a pressure of one ounce without closing, and this regulator is very sensitive, having only eight ounces to resist through its connection with the high-pressure auxiliary regulator. When no gas is used from the low-pressure main, a slight increase of pressure therein causes the auxiliary low-pressure regulator to close its valve tightly and stops the flow of gas from the high-pressure auxiliary regulator through this regulator to the low-pressure main. The needle-valve being slightly open, the gas passes to the valve-operating regulator until its pressure increases to eight ounces, which exerts sufficient power to close the valve tightly. When the consumption of gas in the low-pressure main begins, the auxiliary low-pressure regulator will slightly open, allowing the pressure and gas to escape from the valve-operating regulator until it is reduced to a point which permits the lever connection to open the valve, which occurs at a weight-pressure—for instance, three ounces. As more gas is used this auxiliary pressure also slowly reduces and the valve-operating regulator will gradually open and supply whatever the demand of consumption requires. The pressure between the high-pressure regulator and the needle-valve is constantly held at eight ounces, and this valve being only partly open causes the pressure beyond it to vary to suit the volume required in the mains and also the pressure on the valve-operating regulator to vary, for instance, from three to eight ounces, as required. At the former pressure the valve-operating regulator is permitted to open to feed from the high to the low-pressure main, and at the latter pressure this regulator is operated to close the valve absolutely tight. It will be obvious that this construction and arrangement of parts provides for maintaining a steady pressure in the low-pressure main at all times regardless of the consumption and variations of the high pressure.

Having now described my invention and set forth its merits, what I claim, and desire to secure by Letters Patent, is—

1. The combination with high and low pressure mains, of an interposed valve, a regulator for operating said valve, an auxiliary high-pressure regulator in communication with the high-pressure main and with the valve-operating regulator, and an auxiliary low-pressure regulator in communication with the low-pressure main and said valve-operating regulator and controlled by the low pressure.

2. The combination with high and low pressure mains, of an interposed valve, a regulator for operating said valve, an auxiliary high-pressure regulator in communication with the high-pressure main and with the valve-operating regulator, and an auxiliary low-pressure regulator in communication with the low-pressure main and said valve-operating regulator and controlled by the low pressure, said low-pressure regulator being set to close at less pressure than the high-pressure regulator.

3. The combination with high and low pressure mains, of an interposed valve, a regulator for operating said valve, an auxiliary high-pressure regulator in communication with the high-pressure main and with the valve-operating regulator, and an auxiliary low-pressure regulator in communication with the low-pressure main and said valve-operating regulator and controlled by the low pressure, said low-pressure regulator being set to close at a less pressure than the high-pressure regulator, and said high-pressure regulator being adapted to close at a pressure less than the high-pressure main.

4. The combination with high and low pressure mains, of an interposed valve, a regulator for operating said valve, an auxiliary high-pressure regulator in communication with the high-pressure main and with the valve-operating regulator, an auxiliary low-pressure regulator in communication with the low-pressure main and said valve-operating regulator, and a needle-valve disposed between the high-pressure regulator and the valve-operating regulator.

5. The combination with a high and low pressure main, of an interposed valve, a regulator-valve and diaphragm connected to operate said valve, an auxiliary piping extending from the high-pressure to the low-pressure main and communicating with said diaphragm, a low-pressure regulator disposed intermediate of the valve-operating regulator and low-pressure main and controlled from the latter, and a high-pressure regulator disposed intermediate of said valve-operating regulator and the high-pressure main.

6. The combination with a high and low pressure main, of an interposed valve, a regulator-valve and diaphragm connected to operate said valve, an auxiliary piping extending from the high-pressure to the low-pressure main and communicating with said diaphragm, a low-pressure regulator disposed intermediate of the valve-operating regulator and low-pressure main, a high-pressure regulator disposed intermediate of said valve-operating regulator and the high-pressure main, and a needle-valve disposed intermediate of the high-pressure regulator and the valve-operating regulator.

7. The combination with a high and low pressure main, of an interposed valve, a regulator-valve and diaphragm connected to operate said valve, an auxiliary piping extending from the high-pressure to the low-pressure main and communicating with said diaphragm, a low-pressure regulator disposed intermediate of the valve-operating regulator and the low-pressure main, a high-pressure regulator disposed intermediate of said valve-operating regulator and the high-pressure main, a needle-valve disposed intermediate of the high-pressure regulator and the valve-operating regulator, and controlling-valves applied to said piping intermediate of the mains and the regulators therein.

In testimony whereof I affix my signature in presence of two witnesses.

MIRON G. REYNOLDS.

Witnesses:
   CHARLES K. BAGOT,
   LUTHER F. PENCE.